United States Patent [19]
Renslow

[11] Patent Number: 5,639,953
[45] Date of Patent: Jun. 17, 1997

[54] ALIGNMENT VERIFICATION DEVICE FOR A ROTATING SHAFT

[75] Inventor: Bruce E. Renslow, Castaic, Calif.

[73] Assignee: Hanson Research Corporation, Chatsworth, Calif.

[21] Appl. No.: 607,243

[22] Filed: Feb. 26, 1996

[51] Int. Cl.$^6$ .................................................. G01B 5/252
[52] U.S. Cl. ............................ 73/1.73; 33/533; 73/1.01
[58] Field of Search .......................... 73/1 J, 1 E, 1 R; 33/545, 546, 792, 806, 828, 832–836, 533

[56] References Cited

U.S. PATENT DOCUMENTS

| | | | |
|---|---|---|---|
| 4,251,922 | 2/1981 | Pelotto | 33/832 |
| 4,283,857 | 8/1981 | Graham et al. | 73/1 J |
| 5,539,992 | 7/1996 | Woodhouse | 33/533 |

*Primary Examiner*—Robert Raevis
*Attorney, Agent, or Firm*—Jack C. Munro

[57] ABSTRACT

An alignment verification device for a rotating shaft that utilizes a calibration adapter assembly that has a longitudinal center axis. Mounted on the calibration adapter assembly in a concentric manner is a dial indicator. The stem of the dial indicator is to be placed against a precisely manufactured alignment shaft which has been temporarily substituted for a rotating shaft whose axis of rotation is to coincide with the longitudinal center axis of the calibration adapter assembly. Rotational relative movement between the stem and the shaft will produce readings on the dial indicator with any deviations of the axis of rotation from the longitudinal center axis being discovered by the dial indicator. A zeroing mechanism is to be utilized in conjunction with the calibration adapter assembly prior to connection with the rotating shaft. The zeroing mechanism takes the form of a gauge plug which is to be mounted in a close tolerance manner within a through hole formed within the calibration adapter assembly. The gauge plug has a protruding rod whose longitudinal center axis coincides with the longitudinal axis of the calibration adapter assembly. The stem of the dial indicator is to contact the protruding rod and upon rotational relative movement between the stem and the protruding rod a zero value can be ascertained on the dial indicator.

3 Claims, 2 Drawing Sheets

ALIGNMENT VERIFICATION DEVICE FOR A ROTATING SHAFT

BACKGROUND OF THE INVENTION

1) FIELD OF THE INVENTION

The field of this invention relates to a alignment verification device for a rotating shaft, and more particularly to an alignment verification device for a rotating shaft of a dissolution apparatus which uses a rotating shaft to apply a turbulence to a liquid within which is located a pill.

2) DESCRIPTION OF THE PRIOR ART

Drugs are commonly manufactured and sold in pill form. Pills generally refer to tablets, capsules and caplets. Pills are constructed to release drugs into the body over a period of time. It is generally not desirable to release all of the drug immediately into the body. Therefore, it is necessary before a particular drug is marketed to incorporate that drug in pill form and then to ascertain the amount of drug that would be released into the body over a preset period of time.

There are conventionally available pieces of equipment that are used to ascertain the amount of release of a drug into the stomach of a body such as a human body. Generally these pieces of equipment utilize a plurality of flasks each of which contain a quantity of the liquid. Generally the liquid will essentially duplicate the liquid that is commonly contained within the stomach of the body. The most common type of body would be a human body. However, it is certainly within the scope of this invention that the equipment could be utilized to test absorption rates for other bodies such as horses, cows, dogs, cats and other animals.

Into each flask there is deposited a pill of the drug. A mixing device is inserted within each flask and is to be moved in a manner to essentially duplicate the turbulence that generally would be created naturally within the stomach of the body. Aliquots are removed from each flask at preset periods of time with these aliquots to be tested to ascertain the amount of the drug that has been dissolved within each flask. It is common that before a drug is given permission to be sold that a substantial number of such tests are performed with an average being calculated so that the precise dissolving nature of the drug is ascertained.

In order to precisely ascertain the amount of drug that is absorbed, the equipment that is used will subject the flask to a precisely known temperature. Also the mixing device that is placed within each flask must precisely mix the liquid within each flask in exactly the same manner. Therefore, it is important that the mixing device be centrally located within the flask. It is also important that the mixing device not be skewed in any angle but is located in direct alignment with the longitudinal center axis of the flask.

It is common that such testing apparatuses are able to perform a number of such tests simultaneously. Therefore, before such tests are initiated, it is necessary to ascertain that the position of the mixing paddle for each flask is precisely positioned along the longitudinal center axis of its flask. In the past it was common to just "eyeball" the mixing paddle so that the rotating shaft of the mixing paddle would be in substantial alignment with the longitudinal center axis of the flask. However, under current practice, the eyeballing technique is not sufficient.

Additionally, the mixing paddle would be measured by some kind of simple measurement device again to ascertain that the rotating shaft coincides with the longitudinal center axis of the flask. However, at the current time, these simple types of measuring devices are not sufficient to ascertain accurate rates of dissolution of the pill.

There is currently available dissolution testing equipment where a concerted effort is being made so that each test that is performed within each flask is subjected to precisely the same conditions as in each other flask. However, prior to the present invention, there has not been known to Incorporate a device that is designed specifically to calibrate this equipment to insure that each test that is performed within each flask is identically performed.

SUMMARY OF THE INVENTION

The device of this Invention is intended to be used in conjunction with an apparatus that has a plurality of test flasks within which a liquid is to be contained. Generally the liquid will essentially duplicate the acid contained within the stomach of a body such as a human body. Each flask is contained within a bath with this bath being maintained at a preset temperature with the liquid contained in each flask being maintained at this temperature. The stirrer comprises a blade which is mounted on a rotating shaft. The blade is to be movable from a displaced position from the flask to within the flask. There is a separate blade for each flask. The device of the present invention is to be used to precisely ascertain the centering of this blade so that it coincides with the longitudinal center axis of its respective flask. This centering is accomplished by utilizing a calibration adapter assembly that is placed over and completely covering the flask mounting port. Mounted on the calibration adapter assembly is a dial indicator, with the dial indicator having a linearly movable stem. Lineal movement of the stem changes the reading within a measurement reading section of the dial indicator. The free end of the stem is to be placed in contact with the rotating shaft of a paddle. Relative movement is to occur between the shaft and the stem while at the same time observing of the measurement reading section. If there is a significant variance indicating that the shaft is not precisely in alignment with the longitudinal center axis of the flask, the dissolution test apparatus must be repaired to establish correct alignment. Prior to using the dial indicator, generally it would be desirable to insure that the dial indicator is located at a zero starting position. In order to achieve this, a gauge plug that has a protruding rod is mounted within a precisely centrally located through hole mounted within the calibration adapter assembly with the protruding rod being precisely located on the longitudinal center axis of the calibration adapter assembly. Therefore, as the stem is moved about the protruding rod, if the measurement reading section of the dial indicator is not precisely maintained at a zero position, the dial indicator is to be adjusted so that it is located at a zero position.

The primary objective of the present invention is to utilize the rotating shaft centering device of this invention in conjunction with a calibration kit so that a rotating shaft can be checked as to alignment relative to a flask into which the shaft is to be inserted.

DETAILED DESCRIPTION OF THE PREFERRED EMBODIMENT

Figure 4:
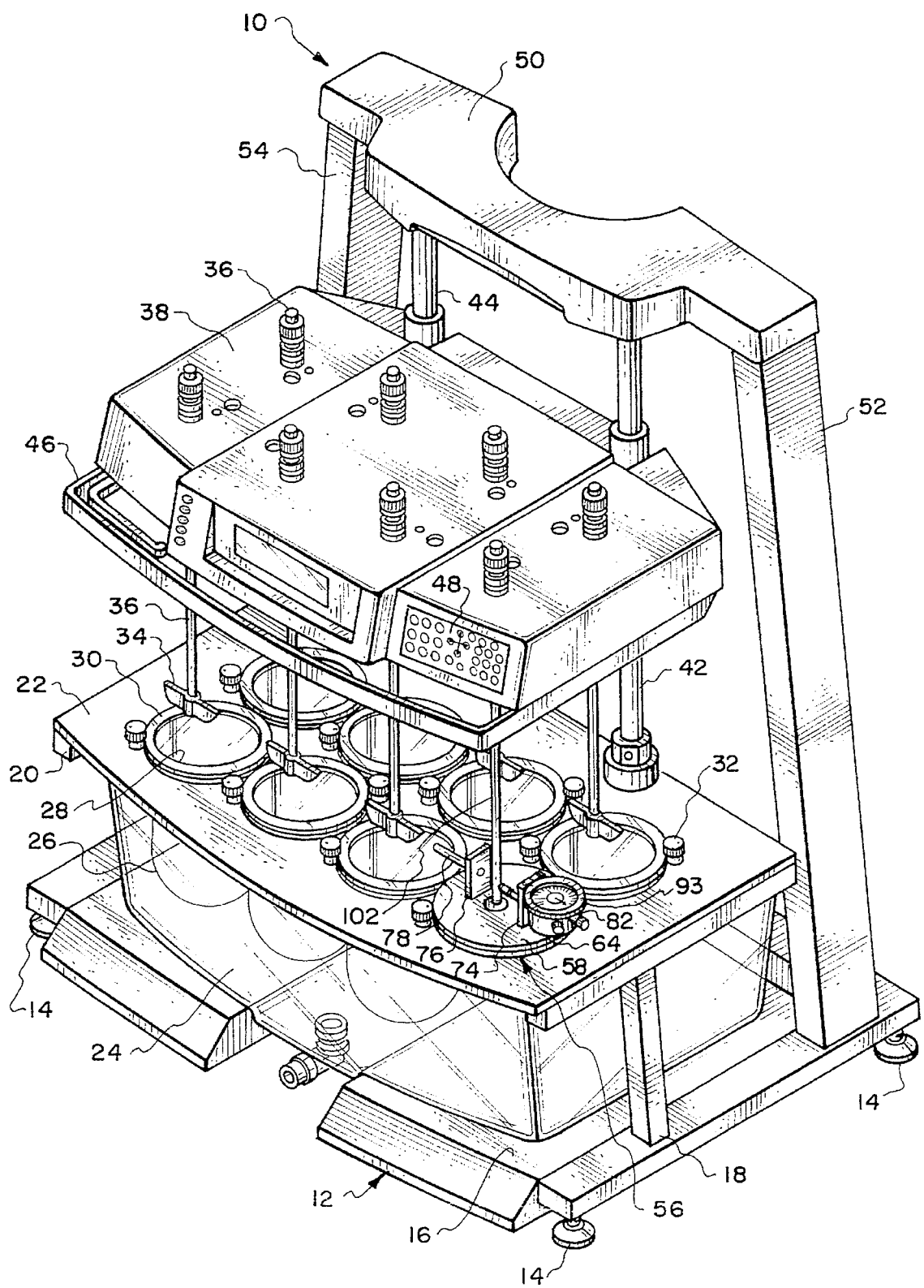
FIG. 4 is an isometric view of an apparatus that is utilized to ascertain the rates of dissolution of pills.

Referring particularly to the drawings, there is shown in FIG. 4 a dissolution test apparatus 10. The apparatus 10 has a base 12 which is mounted on a plurality of feet 14. The feet 14 are adjustable and it is intended that the feet 14 are to be adjusted so that the upper surface 16 of the base 12 is located precisely level. Mounted on the base 12 are a pair of side mounting members 18 and 20. Placed on the mounting members 18 and 20 is a platform 22. In between the platform 22 and the upper surface 16 there is located a tub 24. Tub 24 rests on the upper surface 16. The tub 24 has an internal chamber which is to be filled with the liquid such as water. The water will be circulated with its temperature being precisely controlled by appropriate circulation and temperature controlling systems which are not shown or described in conjunction with this Invention.

Platform 22 has a series of openings (not shown) with eight in number of such openings being shown. The apparatus 10 could have less openings such as six in number. Mounted in conjunction with each opening is a flask 26. The flask 26 has a mouth 28, Surrounding the mouth 28 is an annular flange 30. Mounted on the platform 22 is a plurality of turnable locking members 32. There are two such locking members 32 for each annular flange 30. Locking members 32 are to be moved to a position to securely fix in position each annular flange 30 thereby securing in position each flask 26 to the platform 22. Disengagement of the locking members 32 for a flask will permit the flask 26 to be removed from the platform 22. The main portion of the flask 26 will be submerged within the water contained within the tub 24 when the flask 26 is supported by the platform 22.

A paddle 34 is to be insertable within each flask 26 with it to be understood that there is a separate paddle 34 for each flask 26. Each paddle 34 is connected to a shaft 36. The shafts 36 are mounted in a head 38, it is to be noted that in referring to FIG. 4 that there are eight in number of the shafts 36. Each shaft 36, and its attached paddle 34, is locatable within a flask 26.

The head 38 is movably mounted on vertical rods 42 and 44. The head 38 is movable on the rods 42 and 44 by manually grasping of the handle 46 and lifting or lowering of the head 38. The paddles 34 can be located in a spaced position above each of their respective flasks 26, as is shown in FIG. 4, or the head 38 can be lowered so that the paddle 34 can be submerged within the liquid contained within its respective flask 26. With the paddles 34 submerged, the rotation of the shafts 36 can be initiated by activating of such through control panel 48. It is to be understood that the speed of rotation of the shafts 36 can be selected according to individual needs. The vertical rods 42 and 44 are mounted between the base 12 and yoke 50. Yoke 50 is also mounted relative to the base 12 by means of support members 52 and 54. The head 38 can be adjusted laterally relative to vertical rods 42 and 44. The position of the head 38 is initially established with the front corner shafts 36 being aligned with the longitudinal center axis 40 of their respective flasks 26. When this position is established; the head 38 is laterally fixed relative to vertical rods 42 and 44.

Figure 1:
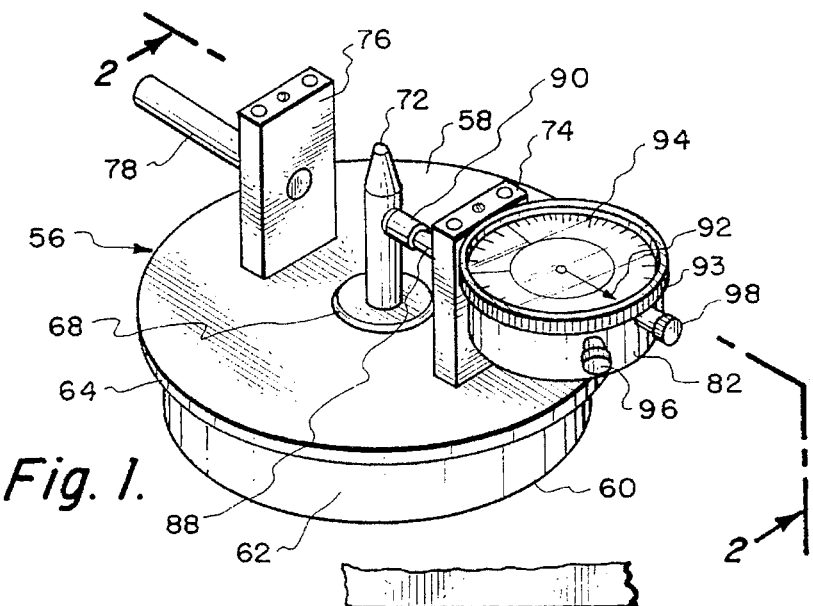
FIG. 1 is an Isometric view of the calibration adapter assembly utilized in conjunction with the alignment verification device for a rotating shaft of the present invention showing the calibration adapter assembly being connected with a gauge plug for purposes of zeroing the position of the dial indicator mounted on the calibration adapter assembly.
Figure 2:
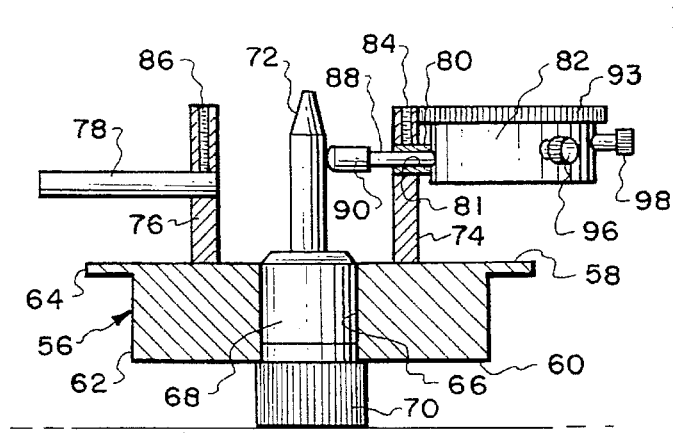
FIG. 2 is a cross-sectional view taken along line 2—2 of FIG. 1.
Figure 3:
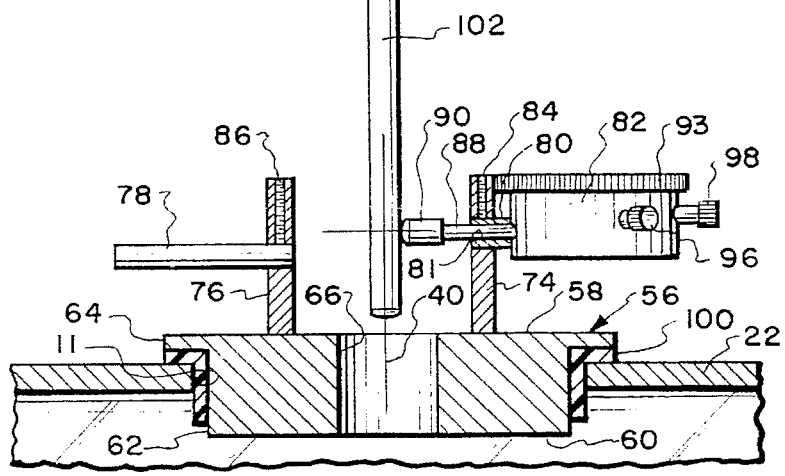
FIG. 3 is a cross-sectional view similar to FIG. 2 but showing the calibration adapter assembly being mounted in conjunction with the opening which would normally support a flask, the calibration adapter assembly being utilized to ascertain the center position of an alignment shaft which has been substituted for a rotating shaft that is to be inserted within the flask.

Referring particularly to FIG. 1, there is shown a calibration adapter assembly 56 which has a flat upper surface 58 and a flat bottom surface 60. The calibration adapter assembly 56 is of circular construction forming a circular sidewall 62. Aligned with the upper surface 58 is an annular flange 64. Centrally formed within the calibration adapter assembly 56 and extending between the upper surface 58 and the bottom surface 60 is a through hole 66.

A gauge plug 68 is to be mounted within the hole 66 in a very close tolerance arrangement. Generally there is not more than a 0.001 inch size differential between the gauge plug 68 and through hole 66. The head 70 of the gauge plug 68 is to abut against the flat bottom surface 60. Fixedly mounted and centrally disposed along the longitudinal center axis of the gauge plug 68 is a protruding rod 72. The position of the protruding rod 72 in conjunction with the gauge plug 68 is precisely located. The protruding rod 72 and the gauge plug 68 are manufactured to a high degree of tolerance. The protruding rod 72 is to be aligned along the longitudinal center axis 40 and extend outward from the flat upper surface 58.

Fixedly mounted on the flat upper surface 58 are blocks 74 and 76. Blocks 74 and 76 are diametrically located opposite each other on opposite sides of the protruding rods 72. Fixedly mounted in the block 76 by means of set screw 86 and extending laterally from block 76 is a rod 78. Rod 78 is to function as a handle that can be used by a human to grasp and rotate the calibration adapter assembly 56. Fixedly mounted within the block 74 by means of set screw 84 is a sleeve 80. The sleeve 80 is fixedly connected to dial indicator housing 82.

Movably retained within the longitudinal through opening 81 of sleeve 80 is a stem 88. The outer end of the stem 88 is formed into a tip 90. Mounted within the dial indicator housing 82 is an appropriate mechanism (not shown) which will move the pointer 92 located on dial face 94. The dial face 94 is to be adjustable so that with the tip 90 coming into contact with protruding rod 72 the pointers 92 should be located at the zero position. The pointer 92 is to be located at the zero position by turning of ring 93 which also turns dial face 94. When the zero position is obtained, lock nut knob 96 is tightened thereby fixing in position the dial face 94 relative to the housing 82. The knob 98 can be manually turned which will result in movement of the stem 88 without the tip 90 being moved against any exterior structure. At times it may be desirable to just move the tip 90 away from rod 72 during initial installation. After installation, the knob 98 is turned until the tip 90 contacts the protruding rod 72 or a shaft 36.

Rod 78 is to be used as a handle to rotate the calibration adapter assembly 56 at least one revolution about the protruding rod 72. At the same time, the user is to observe the dial face 94 and make sure that the pointer 92 remains on the zero position. If the pointer 92 does remain on the zero position, it is assured that the dial indicator housing 82 is precisely concentrically located relative to the longitudinal center axis 40. The gauge plug 68 is thusly referred to as a zeroing mechanism.

The stem 88 is movable linearly in a given direction toward and away from said protruding rod 72 or shaft 36.

The user then retracts the stem 88 by operating of retract knob 98 so as to displace the tip 90 from the longitudinal center axis 40. The gauge plug 68 is then removed from the through opening 66. A flask 26 is then removed from the annular plastic ring 100 which is mounted within opening 101 of the platform 22. The calibration adapter assembly 56 is then placed within the ring 100 with the annular flange 64 resting against the annular ring 100. This now orients the longitudinal center axis 40 of the calibration adapter assembly 56 in alignment with the longitudinal center axis of the flask 26.

Because of the low frictional characteristics of the annular plastic ring 100, the calibration adapter assembly 56 can be readily rotated manually by the application of a small amount of force to the rod 78. The shaft 36 that aligns with the calibration adapter assembly 56 is removed from the head 38. In its place, there is mounted a precisely manufactured straight alignment shaft 102. The alignment shaft 102 is located against the tip 90. The head 38 is then moved to a lowermost position while observing the position of the pointer 92. Between the lowermost position and the uppermost position of the head 38, the maximum displacement of the pointer 92 of the dial indicator should not exceed 0.50 millimeters. The procedure is to be repeated for each shaft 36.

The alignment shaft 102 is then removed and the shaft 36 reinstalled in position. The head 36 is lowered sufficiently to where tip 90 will contact the shaft 36 at a position directly adjacent its paddle 34. The shaft 36 is then driven so to be rotated at about 50 rpm. The varying of the position of the pointer 92 should not exceed 1.0 millimeter. If that value is exceeded by the pointer 92, the shaft 36 is either straightened or replaced. This procedure is to be repeated for each shaft 36.

What is claimed is:

1. An alignment verification device for a rotating shaft comprising:

a calibration adapter assembly having a longitudinal center axis; and a dial indicator mounted on said calibration adapter assembly, said dial indicator having a measurement reading section, said dial indicator being movable in a precise circle concentrically about said longitudinal center axis, said dial indicator having a stem which is movable linearly in a given direction, lineal movement of said stem produces different readings within said measurement reading section, said given direction being substantially perpendicular to said longitudinal center axis, whereby said stem is to be placed against an alignment shaft which has been substituted for the rotating shaft with the rotational axis of the alignment shaft coinciding with said longitudinal center axis, and upon rotation of the calibration adapter assembly, any deviation, and the amount thereof, of the alignment shaft (and hence the rotating shaft when it is replaced after removal of the alignment shaft) from said longitudinal center axis will be noted on said measurement reading section.

2. The alignment verification device for a rotating shaft as defined in claim 1 wherein:

handle means mounted on said calibration adapter assembly, said handle means permitting manual pivoting of said calibration adapter assembly about said longitudinal center axis.

3. The alignment verification device for a rotating shaft as defined in claim 1 wherein:

a zeroing mechanism for said calibration adapter assembly to be used prior to connection of said calibration adapter assembly with the rotating shaft, a through hole formed in said calibration adapter assembly, said through hole having a center axis that coincides with said longitudinal center axis, said zeroing mechanism comprising a gauge plug having a protruding rod, said gauge plug located in said through hole in a close tolerance manner with said stem placed against said protruding rod, whereby rotation of said stem is to produce a zero reading on said measurement reading section.

* * * * *